United States Patent [19]
Gdula et al.

[11] 4,327,420
[45] Apr. 27, 1982

[54] POLYPHASE REFERENCE GENERATOR

[75] Inventors: Michael Gdula, Albany; Raymond J. Hodsoll, Saratoga; Edwin C. Underkoffler, Schenectady, all of N.Y.

[73] Assignee: General Electric Company, Schenectady, N.Y.

[21] Appl. No.: 164,259

[22] Filed: Jun. 30, 1980

[51] Int. Cl.³ .................. G06F 15/31; H03B 19/00
[52] U.S. Cl. ............................ 364/721; 328/14; 331/45
[58] Field of Search .................. 364/721, 851, 852; 307/262; 328/14, 155; 331/45

[56] References Cited
U.S. PATENT DOCUMENTS

| | | | |
|---|---|---|---|
| 3,633,017 | 1/1972 | Crooke et al. | 364/721 |
| 3,657,657 | 4/1972 | Jefferson | 364/721 X |
| 3,832,641 | 8/1974 | Herchenroeder | 331/45 X |
| 4,078,192 | 3/1978 | Fultz | 364/721 X |

Primary Examiner—Jerry Smith
Attorney, Agent, or Firm—Geoffrey H. Krauss; James C. Davis, Jr.; Marvin Snyder

[57] ABSTRACT

A reference generator, providing a plurality of precisely-phased output signals, utilizes a microprocessor having a table of values for the output waveforms stored in a read-only memory thereof. The table entries include a multiplicity of values for providing a stepwise representation of each of the desired waveforms, which may have constant angular increments therebetween. The incremental tabular values are consecutively read responsive to the count in a timer, integral in the microcomputer, which is sequentially advanced by the pulse output of a voltage-to-frequency converter receiving a rate signal. The tabular values are converted to analog polyphase reference signals by a like number, equal to the number of phases, of digital-to-analog converters and associated low-pass filters. The output waveform peak amplitude is established by a dual-polarity reference voltage generator, responsive to a variable level signal. Essentially instantaneous reversal of the polyphase waveforms is provided by "angle complement" control of the present point utilized within the tables. The timer circuit provides steps of increasing size through the lookup-table to provide a gradual degradation in the number of steps in the output waveform when the rate signal exceeds the microcomputer execution speed upper limit.

10 Claims, 5 Drawing Figures

POLYPHASE REFERENCE GENERATOR

BACKGROUND OF THE INVENTION

The present invention relates to waveform generators and, more particularly, to a novel circuit for generating a polyphase waveform.

Many uses for a polyphase reference generator exist. For example, in an electric vehicle, a polyphase (typically three-phase) AC generator may be utilized to excite a motor providing power to the driven wheels; selection of vehicle forward and reverse directions is controlled by the phase relationship of the polyphase driving waveforms. Vehicle acceleration and velocity are controlled by the polyphase signal frequency and amplitude. Thus, while the actual motor current, provided by a battery and the like, may be controlled by high-current-flow solid-state devices, the driving signals for the solid-state devices must be provided by a polyphase reference generator; the frequency, phase and amplitude of the polyphase signal must be controllably provided to the desired degree of accuracy. To provide maximum reliability concurrent with minimum costs and volume occupied by the reference generator, it is highly desirable to minimize the number of circuit elements.

BRIEF SUMMARY OF THE INVENTION

In accordance with the invention, a polyphase reference generator utilizes a single-chip microcomputer of the type having clock generator, externally-incrementable timing register, accumulator register and a plurality of addressable data registers, in addition to programmable read-only-memory. Each of the plurality of output phase signals is characterized by step-wise approximations thereof, with each signal being divided into substantially equal increments. The step-wise incremental digital values of the output waveforms are stored in the microcomputer read-only-memory and are individually retrieved therefrom responsive to the count contained in the timer register, which count is incremented by digital signals received from a voltage-to-frequency converter, itself receiving an analog rate signal. The step-wise output signal data for each of the plurality of phases is provided to a digital-to-analog converter associated with that phase, for providing the analog step-wise approximation of the phase waveform. The amplitude of the output waveform is adjustable in accordance with the amplitude of an analog level signal. A direction-determining signal is checked at the end of each step of the step-wise approximation of the output voltages, to determine if phase reversal is required; if such reversal is required, the microcomputer calculates a new increment equal to one-half the total number of increments minus the increment number being utilized immediately prior to a reversal command, to provide a given phase output. In a three-phase generator, this given phase is Phase A. The microcomputer switches the digital data for the phase B and phase C signals to provide substantially instantaneous reversal of phase rotation without step perturbations on any output.

In one presently preferred embodiment, the output waveforms are three-phase sinusoids having a controlled amount of third harmonic. Each phase is resolved into approximately 72 steps. Operation beyond the maximum resolution rate frequency is enabled by periodic skipping of counter register states. A clock buffer circuit for providing multi-phase synchronization signals is also provided.

Accordingly, it is an object of the present invention to provide a novel polyphase reference generator circuit providing a plurality of output signals having programmable phase direction, frequency and amplitude.

This and other objects of the present invention will become apparent upon consideration of the following detailed description when read in conjunction with the drawings.

DETAILED DESCRIPTION OF THE INVENTION

Figure 1:
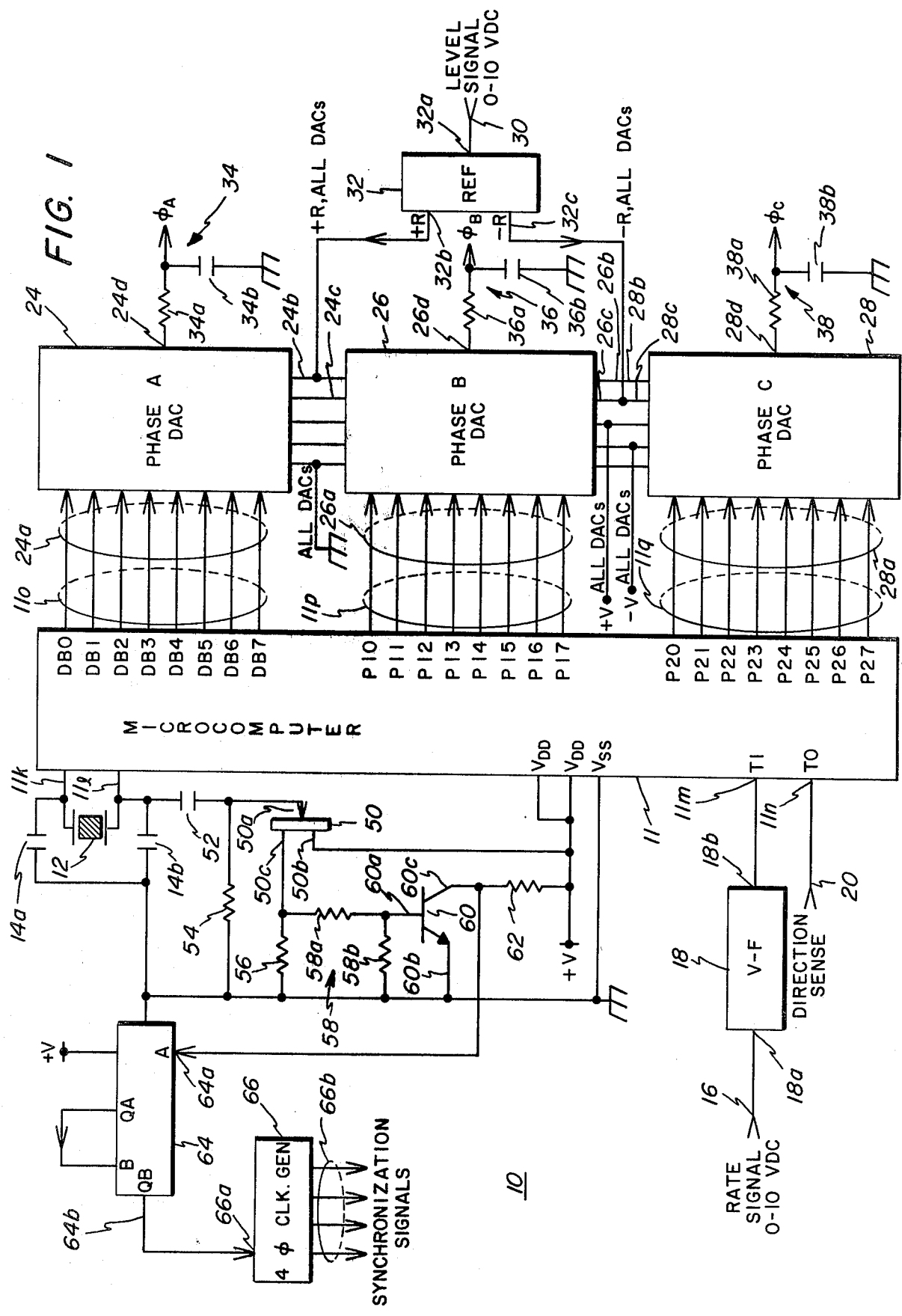
FIG. 1 is a schematic block diagram of a novel polyphase reference generator, providing three-phase sinusoidal output waveforms, in accordance with the principles of the present invention.
Figure 1A:
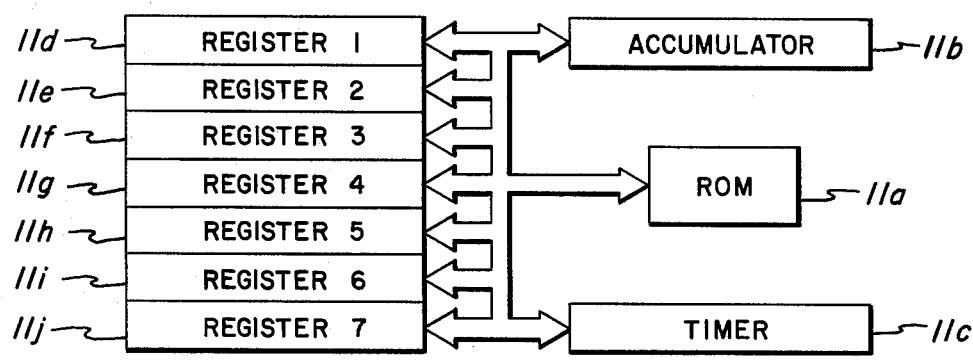
FIG. 1a is a schematic representation of the accumulator, timer register and the addressable register bank of the microcomputer utilized in the embodiment of FIG. 1, and useful in understanding the present invention.

Referring initially to FIGS. 1 and 1a, a presently preferred embodiment of our novel polyphase reference generator is illustrated as a three-phase AC reference generator 10. The polyphase reference generator utilizes a single-chip integrated circuit microcomputer 11, which includes a read-only memory (ROM) 11a, an accumulator register 11b, a programmable timer (or counter) register 11c and additional addressable registers, e.g., illustratively 7 addressable registers 11d–11j, sequentially numbered as registers 1-7. For purposes of illustration, microcomputer 11 may be an INTEL 8748, although other single-chip microcomputers are available and can be selected by those skilled in the art in accordance with the general requirements set forth herein.

Microcomputer 11 is supplied with an operating potential +V connected to its operating potential ($V_{DD}$) input leads, with respect to a ground potential substrate ($V_{SS}$) lead. Advantageously, microcomputer 11 includes self-contained clock oscillator circuitry, whereby an operating clock frequency is determined by connection of a resonator element 12, such as a quartz crystal and the like, between designated leads e.g., 11k and 11l, of the microcomputer; additional elements, such as capacitors 14a and 14b may be required between the microcomputer oscillator-section leads 11k and 11l, and ground potential, for causing oscillations to occur.

An analog rate signal, having an amplitude continuously variable between 0 and +10 volts DC, is provided at a rate input 16 and is coupled to the input 18a of a voltage-to-frequency (V-F) converter means 18. The waveform at an output 18b of the V-F means is a periodic digital waveform having a frequency related to the amplitude of the rate signal at input 16. V-F means output 18b is connected to the counter-timer TI input 11m of the microcomputer. A binary direction signal is provided at a second reference generator input 20 and is coupled directly to a microcomputer T0 input 11n.

Eight-bit microcomputer data bus output 11o, comprising the eight data bus lines DB0–DB7, is connected to an eight-bit data input port 24a of a first four-quadrant, multiplying digital-to-analog converter (DAC) means 24. Similarly, first and second eight-bit parallel output ports 11p and 11g, respectfully comprising parallel output bit lines P10–P17 and P20–P27, are respectively connected to the eight-bit digital data input ports 26a and 28a of second and third four-quadrant, multiplying DAC means 26 and 28, respective. Each of DAC means 24, 26, and 28 is connected to ground potential and receives positive and negative operating potentials +V and −V.

An analog level signal having an amplitude in the range of 0 to +10 volts DC is provided at a third reference generator circuit input 30, connected to the input 32a of a dual-polarity analog reference voltage circuit 32. Reference circuit means 32 provides positive and negative analog reference voltages of magnitude +R and −R, respectively, at the respective outputs 32b and 32c, for connection to respective positive and negative multiplier signal inputs 24b and 24c, 26b and 26c, and 28b and 28c, of respective DAC means 24, 26 and 28. Analog voltage magnitude R is proportional to the amplitude of the analog level signal. Each of the DAC means has a respective output 24d, 26d and 28d, at which an analog voltage appears which is the product of a first signed analog voltage, established by the digital data presented at the respective digital input port 24a, 26a or 28a, and the absolute value |R| of the level signal, provided by the outputs of reference voltage means 32. Each DAC means output 24d, 26d and 28d, respectfully, is connected to the input of an associated low-pass filter 34, 36 and 38, respectively. Thus, in a three-phase reference generator providing phase A ($\phi_A$), phase b ($\phi_B$) and phase C ($\phi_C$) outputs each of identical amplitude (established by the magnitude of the level signal at input 30) and having substantially equal 120° phase difference therebetween, the output 24d of the first (phase A) DAC means is connected to one terminal of a low-pass filter resistance 34a, having its other terminal coupled to ground potential by low-pass filter capacitance 34b. The $\phi_A$ output is obtained at the junction between filter resistance 34a and filter capacitance 34b. Similarly, the outputs 26d and 28d, respectively, of respective phase B and phase C DAC means 26 and 28 are connected to one terminal of respective filter resistors 36a and 38a. The remaining terminal of each of resistances 36a and 38a are respectively coupled to ground potential via a filter capacitor 36b and 38b, respectively. The $\phi_B$ and $\phi_C$ outputs are respectively obtained at the junctions between resistance 36a and capacitance 36b, and resistance 38a and capacitance 38b.

It is often necessary that a system controller (not shown) requires synchronization clock signals. As microcomputer 11 already includes a high-stability crystal-controlled clock generator, operating at a first frequency (typically 6.000 MHz. for the illustrated 8748 microcomputer) this highly stable clock signal may be utilized to provide a single-phase or multiphase synchronization signal. Illustratively, four-phase synchronization signals, having a 1 MHz. clock rate, are to be provided. A high-impedance buffer, utilizing a field-effect transistor 50, receives a portion of the clock signal available at microcomputer clock generator lead 11l. This signal is coupled through a coupling capacitor 52, to the FET gate electrode 50a. A gate resistance 54 is coupled from gate electrode 50a to ground potential. The buffer FET drain electrode 50b is coupled to positive operating potential +V. The FET source electrode 50c is coupled to ground potential through a source resistance 56. The buffered clock signal at gate electrode 50c is applied to the input of a voltage divider 58, having first and second resistances 58a and 58b coupled across source resistance 56. An output transistor 60 has its base electrode 60a coupled to the divider output at the junction between resistances 58a and 58b. The transistor emitter electrode 60b is connected to ground potential, while the transistor collector electrode 60c is connected to operating potential +V through a collector load resistance 62. The buffered and amplified clock signal, at transistor collector electrode 60c, is applied to the A input 64a of a frequency divider means 64. In the illustrated embodiment, wherein the waveform at a frequency counter output 64b is required to have a frequency which is an integral sub-multiple, e.g. one-sixth, of the oscillator frequency, frequency divider 64 is the divide-by-six portion of a TTL 7492 integrated circuit counter, having the first division section output QA applied to the second division section input B and having output 64b taken from the second division section output QB. Output 64b is connected to the input 66a of a four-phase clock generator 66 (such as a Johnson counter and the like) having synchronization signal outputs 66b, e.g. four outputs, at which the required number of synchronization signal phases appear with desired phasing therebetween.

Figure 2:
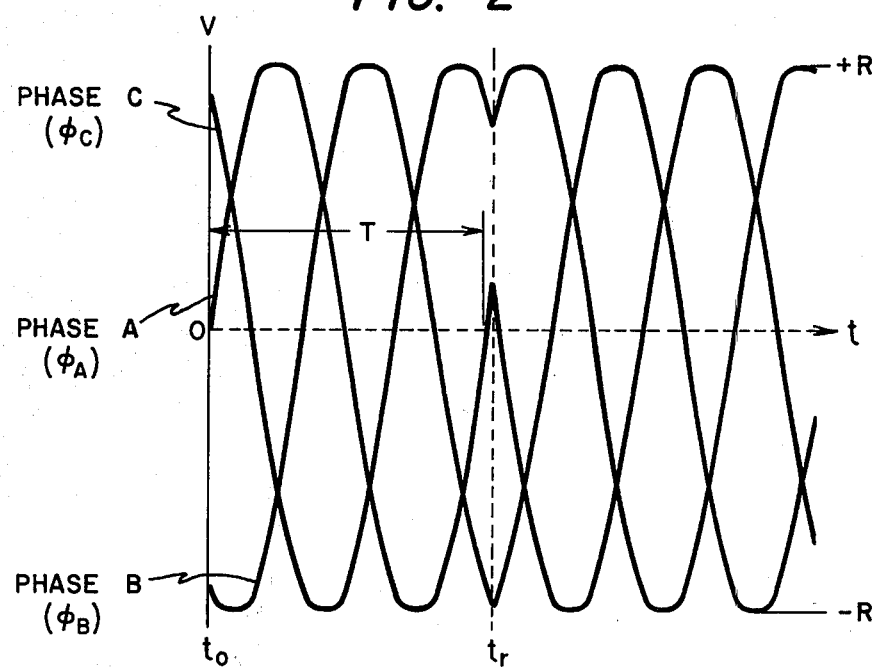
FIG. 2 is a graph illustrating the voltage vs. time relationship of the three-phase sinusoidal signals provided by the polyphase reference generator embodiment of FIG. 1.

Referring now to all of the figures, the presently preferred embodiment of polyphase reference generator 10 generates the three-phase outputs illustrated in FIG. 2. Each of the $\phi_A$, $\phi_B$, and $\phi_C$ waveforms (illustratively, for establishing the power waveform supplied to a three-phase A.C. electric vehicle motor) is substantially a sinusoid, of equal amplitude, with essentially 120 degrees phase-shift between the phases thereof. The waveform has been given a controlled amount of additional third harmonic content, to provide a somewhat flat envelope peak. This flattened waveform peak tends to increase the average power utilized by the load, over the average power provided by a pure sinusoidal wave-shaped containing only the fundamental frequency, without increasing the peak voltage. It will be seen that the three-phase waveforms have peak voltages of +R and −R volts, as established by the level signal at circuit input 30, and have a cycle time interval T which is established by the magnitude of the rate signal provided at circuit input 16. Further, the phase relationship, at a starting time $t_0$, may be established for operation of the load motor in a first direction, responsive to the receipt of a first binary level direction signal at circuit input 20, which direction signal may change to the remaining binary level, at some time $t_r$, to cause reversal of the polyphase waveform (with a resulting change in load motor direction of shaft rotation).

Microcomputer 11 is of the type in which addressing of ROM 11a may be done in paged manner, whereby a page (e.g., page 3) of stored data locations is selected for storage of the step-wise approximation lookup-table for the waveform of each of the plurality of output signal phases. The number of steps for each phase output signal is selected in accordance with the desired resolution and upper frequency limit. In the illustrated embodiment, a resolution of 72 steps per cycle is selected, which results in a maximum, full-resolution frequency of about 200 Hz., for the illustrated 8748 microcomputer operating at a 6 MHz. clock frequency. Thus, the incremental values for each of the desired number of steps of the output waveform are calculated and sequentially stored in a portion of the selected page of memory. It should be understood that a greater or lesser number of steps in the step-wise approximation of the output waveform may be utilized, and that a broad range of different waveforms, including, for example, triangular, trapezoidal and the like waveforms, may have the stepwise approximations therefore utilized. Similarly, it should be understood that while four-quadrant DACs are utilized, with two's complement coding being implemented for the determination of analog waveform polarity, to provide a dual-polarity analog signal, unipolar analog phase signal outputs are equally as well provided for; in the case of unipolar signals, single-quadrant or dual-quadrant DACs may be utilized and the step-wise approximation of the output waveforms need not be coded in two's complement format. Similarly, timer TI input $11m$ may be provided with a fixed frequency rate signal, possibly by frequency division of the microcomputer clock-section signal, to provide a polyphase output waveform of fixed frequency, whereby input 16 and V-F means 18 are not required; removal of dual-polarity reference voltage generator means 32 may also be desirable if polyphase output signals having a fixed peak amplitude are to be utilized. It should also be understood that the polyphase reference generator may be implemented utilizing hard-wired logic for controlling digital data flow between an array of registers utilized in conjunction with a timer and a clock oscillator, to provide the equivalent of microcomputer 11, although at somewhat increased cost and physical volume.

Figure 3A:
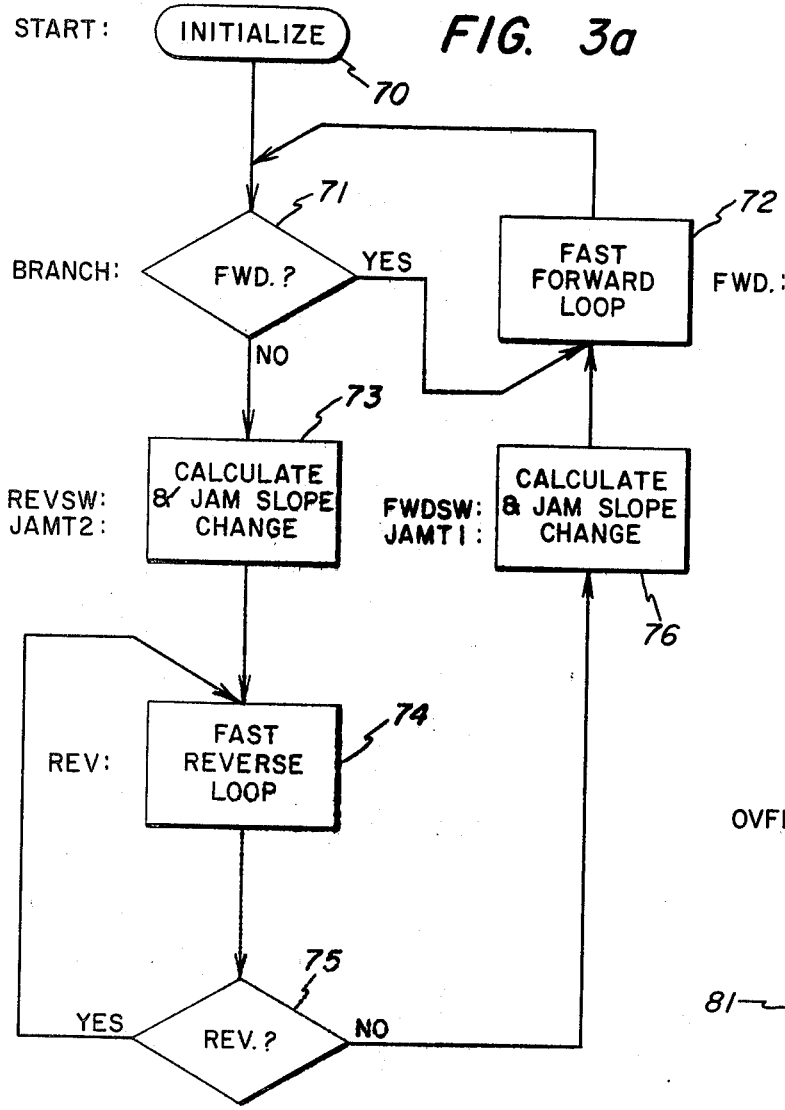
FIGS. 3a and 3b are flow charts illustrating the programming for operation of the polyphase reference generator embodiment of FIG. 1, for use as a controller for a three-phase AC motor.

In operation, polyphase waveform generator 10 commences operation with an initialization procedure, shown as step 70 in FIG. 3a. Thus, upon application of power to the circuit, the microcomputer reads the initial location in memory, to obtain an instruction to access a START procedure. The first step of the START procedure is to load, via the accumulator, an initial counter value into register 7. In the illustrated embodiment, with 72 steps for one waveform cycle, this initial value is $-72$. This initial counter value indicates the location, e.g. 72 addresses below the top of memory page 3, in the lookup-table of the read-only-memory, at which the first step-wise approximation value for the phase A waveform is located. This value will reside in, and be available during operation from, register 7. Fixed "bias" numbers are then loaded into registers 6 and 5, respectively, for indicating the difference in lookup-table addressable location of phase B and phase C table values, relative to a present phase A lookup-table address. The register 5 and 6 values also remain stored, without change, during operation of the reference generator circuit.

Figure 3B:
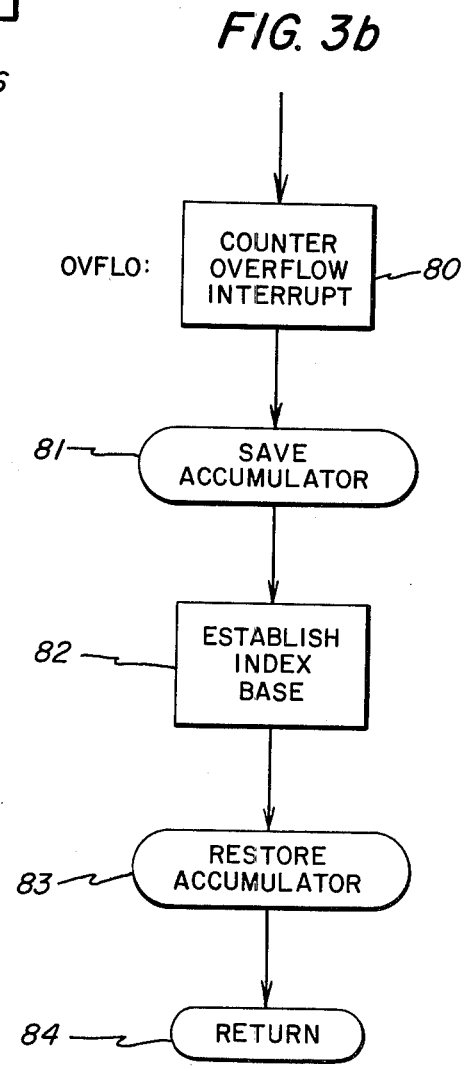

To facilitate reversal of the polyphase waveform, as at time $t_r$ in FIG. 2, circuit 10 calculates a new phase A index (X') equal to the difference between 180 degrees and the phase A index (X) immediately proceeding reversal, and then interchanges the values for the remaining two phases e.g., the lookup-table phase B data is routed to the phase C DAC means and the lookup-table phase C data is routed to the phase B DAC means. Thus, new phase A index X' is calculated, at the time of reversal, as $X'=(180°-X)$, where X is the phase A index prior to reversal, and in the illustrative embodiment provides a symmetrical magnitude in the phase A lookup-table, but with opposite slope. The phase B and phase C data at the time of reversal have magnitudes equal to the magnitude prior to reversal, with only a slope change occurring. By use of the preceding procedure, a uni-directionally counting timer $11c$ (such as is available in the 8748 microcomputer) may be utilized, without requiring excessive execution time to calculate a down count, and without requiring the addition of a bi-directional counter in order to traverse the lookup-tables in opposite direction (equivalent to reversing the time sequence thereof as required for a phase change). Register 1 is loaded with a numerical value utilized to ascertain that the calculated lookup-table address is indeed one of the allowably-addressed locations within the table. Concurrent therewith, allowance for the enablement of an overflow (OVFLO) interrupt (illustrated in FIG. 3b and discussed herein-below) is made, whereby a determination that the calculated address is not one of the allowable addresses of the lookup-table, can be dealt with. The initialization START procedure concludes by moving the initializing counter value from register 7 into the programmable timer register $11c$.

A BRANCH procedure 71 now checks the digital value of the direction sense signal at TO input $11n$. If a pre-selected first binary value is present, indicative of a command to provide output waveforms having a first direction (as for causing the motor to move the electric vehicle forward) the sequence jumps to fast forward loop 72. Conversely, if the direction sense signal is of the remaining binary value, the BRANCH check indicates that a forward direction is not commanded and a waveform reversal, as at $t_r$ of FIG. 2, is required.

Assuming that normal waveform generation (the forward FWD direction) is commanded by the binary value of the direction sense signal, the timer register value (still at the initial offset value) is first moved into the accumulator and then saved in register 4. The timer data in the accumulator provides an address within the lookup-table from which to obtain the first step-wise approximation of the phase A waveform voltage. Upon acquiring the eight-bit phase A data from the lookup-table, this data is output via data bus parallel output $11o$ to the phase A DAC inputs $24a$, providing an initial phase A analog voltage. The phase A address, in the accumulator, is now added to the phase B "bias" value, retrieved from register 6, and the resulting sum, now resident in the accumulator, provides a new lookup-table address for the initial step-wise approximation data for the phase B voltage. This phase B data is obtained from the lookup-table and provided to the first parallel data output port $11p$ and thence to the data inputs of phase B DAC means 26, to provide the phase B step-wise approximation output analog voltage. The timer data previously stored in register 4 is returned to the accumulator and the phase C "bias" value is retrieved from register 5 and added thereto, to provide another lookup-table address at which step-wise approximation data for the phase C waveform is located. The phase C data is retrieved from the lookup-table and output via second parallel data output port $11q$ to the phase C DAC means, to provide a phase C step-wise approximation analog voltage. Thus, in several microseconds, data having the proper phase relationship is provided to each of the DAC means to provide a first step-wise approximation value for each of the plurality of output phase voltages. As the data is held at the bus, first and second output ports, the associated analog phase output voltages continue to be present until the digital data at the associated output ports is changed.

At the conclusion of the first, and each subsequent, lookup of all the plurality of phase voltage digital data, BRANCH step 71 is returned to and the direction sense input is again checked to ascertain that a direction reversal is not required. Upon ascertaining that the same direction of waveform motion is to be utilized and that no change in waveform direction is required (e.g., the load motor is still to be operated in the forward direction), the forward loop 72 is again entered. If a pulse has not been received from V-F means 18 at the timer TI input 11m, the timer register count has not been increased and the lookup-table is reentered at the same location for phase A, and, due to the constant phase B and phase C offsets, at the same location for the phase B and phase C data. However, if the timer TI input 11m has received a "clock" pulse from the output of the V-F means (with the occurance frequency of the pulse being related to the amplitude of the rate signal) the timer count has been advanced beyond the initial counter value. This new count is moved into the accumulator, stored in register 4, and utilized as the new (the next-subsequent) address for retrieving phase A data from the phase A lookup-table. The new phase A data is output to the phase A DAC and provides an updated phase A analog voltage. Immediately thereafter, the phase B "bias" value is retrieved from register 6, added to the accumulator value, and used to address a new (the next-subsequent) phase B lookup-table location. The new phase B data is output to the phase B DAC and provides a new phase B output voltage. Immediately thereafter, the new timer count is retrieved from register 4, added to the phase C "bias" value retrieved from register 5 and the sum thereof provides a new (the next-subsequent) phase C lookup-table location, at which the new phase C data resides. This phase C data is output to the phase C DAC and provides a new phase C analog output voltage. It will be seen that the rate at which the new phase A, phase B and phase C look-up-table locations are sequentially addressed, is dependent upon the rate at which the timer counter is incremented by the output pulses of the voltage-to-frequency converter, which is itself responsive to the magnitude of the rate signal.

Assuming now that a direction reversal is commanded, the remaining binary value is present upon checking the binary value at direction sense TO input 11n. Therefore, the result of the BRANCH comparison step 71 indicates that the reversal switching REVSW sequence is to be entered. In this sequence, the phase A waveform angle X, immediately preceding the direction reversal check, is utilized to calculate a new angle X'=(180−X) degrees. The new angle X' is inserted or "jammed" into the timer register. This is accomplished by moving the X data contained in timer register 11c, at the time that the direction sense input 11n is interrogated and found to have a binary level indicative of a reversal, into the accumulator and taking the one's complement of the number X, which provides the binary number (−X) in the accumulator. To the accumulator contents is added the contents of register 2, in which was stored at circuit initialization an additional number equal to the number of step in one-half cycle (or 180°). Thus, the accumulator now contains the value X'=(180−X). the contents of the accumulator is temporarily saved in register 4; the contents of the accumulator is then added to the contents of register 1, which contains a check value, originally stored thereat at initialization. The sum now in the accumulator is checked and if a valid lookup-table location is present, the temporarily-saved value X' (from register 4) is moved back to the accumulator and is utilized as the new phase A lookup-table index. The new phase A index X is used to address a new table location to cause data to be presented to the phase A DAC means. The new phase A index is then offset respectively by the phase C or B bias values to generate lookup-table indices to be entered for the respective phase B and phase C data locations. Note that the phase B and phase C bias values have been reversed, for carrying out a phase reversal. The new phase B and phase C data are sequentially provided to the associated DAC means, in manner similar to that previously described hereinabove with respect to the forward loop. Obtaining new step-wise approximation digital data, establishing a magnitude of the three-phase voltage outputs, completes the first fast reverse loop (step 74).

A BRANCH check is again made in step 75 to ascertain whether a direction change (i.e. to forward) is required. If no direction change is then commanded, the fast reverse loop (REV) is repeated. If a direction change is commanded, the forward switching and slope change (FWDSW and JAMTI) program of step 76 is initiated. This program sequence is substantially identical to that sequence previously used in the REVSW and JAMT2 sequence of program step 73, i.e. the current timer register index X' is moved to the accumulator, the one's complement is taken and is added to the number of steps in a half-cycle, as previously entered in register 2. The new value of X=(180−X') is checked and, if equal to a valid-lookup-table location, the new value is moved into the accumulator and utilized as the lookup address for retrieving the phase A data. Phase B and phase C data are then sequentially retrieved from the table, without interchange, by means of the addition of "bias" values as previously explained hereinabove.

The foregoing assumes that, during the calculation of the new phase A index for a phase reversal, the new lookup-table address X' was a valid table location. In the event that the checking step indicates that a valid table location has not been calculated, the calculated table location is adjusted to the appropriate valve within the table.

During normal operation, the count in the timing register is always increasing toward a maximum register calculating value. Upon reaching this maximum value, the next input pulse, at input 11m, will cause an overflow (OVFLO) interrupt to occur, enabling the sequence of FIG. 3b. Accordingly, upon concurrence of a counter overflow interrupt in step 80, the contents of the accumulator is saved in register 3, as shown in step 81. Subsequently, the timer base index is established by moving the timer offset value, initially stored in register 7 during initialization step 70, through the accumulator and into timer register 11c. The contents of the accumulator, previously saved in register 3, is moved back to the accumulator in step 83, and the sequence, in step 84, returns to the point of the program at which the lookup-table location address overflow interrupt occured.

The foregoing is accomplished with the following 78 byte, hexadecimal-coded program:

| Prog. Step. | Program Commands | | | | | | | | | | | | | | |
| --- | --- | --- | --- | --- | --- | --- | --- | --- | --- | --- | --- | --- | --- | --- | --- |
| 0000 | 04 | 0C | 00 | 00 | 00 | 00 | 00 | AB | FF | 62 | FB | 93 | 23 | B8 | AF | BE |
| 0010 | B7 | BD | 6E | BA | 95 | B9 | 48 | 62 | 25 | 45 | 04 | 32 | 42 | 37 | 6A | AC |
| 0020 | 69 | F6 | 24 | AC | FC | 62 | 42 | AC | E3 | 02 | FC | 6E | E3 | 39 | FC | 6D |
| 0030 | E3 | 3A | 36 | 26 | 42 | 37 | 6A | AC | 69 | F6 | 3C | AC | FC | 62 | 42 | AC |
| 0040 | E3 | 02 | FC | 6E | E3 | 3A | FC | 6D | E3 | 39 | 26 | 3E | 04 | 1C | | | all of which object program is stored in an initial portion of the first page of memory.

When utilized to control the drive motor of an electric vehicle, direction is normally not reversed unless the vehicle, and therefore the motor, speed is relatively low. The programming requires about 50 microseconds in the illustrated embodiment to: output the three analog phase voltages; check for direction reversal; and loop back to fetch the new counter value. Therefore, three-phase analog output voltages having waveforms defined by 72 discrete points per cycle, can be generated to an approximate upper frequency limit of about 200 Hz. Since the timer register 11c is incremented by the pulsed signal produced by the V-F means responsive to the analog rate signal, the counter is incremented and keeps track of the desired rate independent of the execution time required by the microcomputer program to: shift the contents of the various registers, the accumulator, ROM locations and so fourth; and provide the data at the bus, first and second parallel output ports. Therefore, if the timer register is incremented at a rate exceeding the full-resolution rate of the polyphase reference generator, the number of steps approximating the waveform is reduced by simply skipping over those steps called for by the count in the timer register at the times when the processor is otherwise busy. Thus, a rate signal requiring a three-phase, 400 Hz. waveform, increments the timer register contents at a rate approximately twice as fast as the remainder of the microcomputer can follow. The system, being initialized with the first timer value for the waveforms, outputs data for that initial value, which data is converted to the stepwise analog approximations by the associated DAC means. When the timer is next interrogated, the count stored therein has now been incremented twice, whereby the data at memory locations associated with the third waveform incremental step are presented; the second incremental step data is not retrieved from the table as the phase A memory location for the second step has been wiped from the timer register while first step activity is still occuring. It will be seen that operation of the polyphase reference generator circuit at twice the full-resolution waveform frequency causes every other waveform approximation step to be skipped. Similarly, operation of generator 10 with a rate signal, at an input 16, requiring a waveform at three times the maximum full-resolution frequency, causing every third approximation step to be utilized, with the intermediate two approximation steps being skipped. Therefore, the waveshapes slowly degrade at high frequencies by skipping over points in the table, with only every n-th point being utilized, where n is the ratio of (rate frequency requested) to (maximum rate frequency for full resolution). In many applications, a satisfactory load waveform will be provided with only 10-15 steps in a single period of any one output phase, a discernable and useable waveshape results up to about six times the maximum full-resolution frequency, e.g., to about 1.2 kHz. for the 200 Hz. full-resolution frequency of the illustrated embodiment.

While a presently preferred embodiment of our novel polyphase reference generator has been described herein, many modifications and variations will now become apparent to those skilled in the art. It is our intent, therefore, to be limited only by the scope of the appending claims and not by the specific details of the one embodiment set forth herein.

What is claimed:

1. A reference generator for providing a plurality of differently phased output waveforms, each of preselected waveshape and amplitude, comprising:

a plurality of data output ports equal in number to the number of said output waveforms;

memory means for storing a lookup-table of step-wise approximations of the amplitudes of a complete repetition of each of the plurality of waveform phases, each step-wise approximation being stored as digital data at a uniquely addressed location and retrievable therefrom;

a timing register having an input for receiving an external signal to increment the count in said timing register, and having, upon commencement of operation, the count therein initialized with the address of the first location of said lookup-table for a first one of said plurality of waveform phases;

a plurality of addressable data registers, including an accumulator register for adding data from preselected ones of said plurality of addressable data registers to the digital count then presently contained in said timing register; each resulting number being provided by said accumulator register to said memory means as respective addresses of addressable locations therein at which are stored corresponding step-wise waveform approximation data for a present value of each of the remaining respective phases of said output waveforms;

means receiving a rate signal for providing said external signal to said timing register input for advancing the count stored therein to determine at any particular time the address in said lookup-table of said memory means and to cause said memory means to provide the first output waveform address;

said memory means providing the data stored at said first output waveform address to said first one of said plurality of output ports;

said memory means also sequentially providing said waveform approximation data to that one of said plurality of output ports associated with that one of said output phase signals for which a present memory means address was provided; and a plurality of means equal in number to the number of output waveform phases, each receiving the digital data from an associated one of said plurality of output ports for providing an analog voltage of magnitude established at least in part by the digital data then being received.

2. The reference generator of claim 1, wherein said plurality of addressable registers, said timing register, said plurality of output ports and said memory means are contained in a microcomputer.

3. The reference generator of claim 1, further comprising means receiving an amplitude signal for providing at least one reference voltage to at least one of said analog voltage providing means, the amplitude of the phase waveform output from that analog voltage providing means being established responsive to both the amplitude of the reference voltage and the step-wise approximation data then being received.

4. The reference generator of claim 3, wherein all of said analog voltage providing means receive said at least one reference voltage and have output voltage amplitudes established responsive to both the amplitude of both the reference voltage and associated step-wise approximation data then being received by each individual one of said analog voltage providing means.

5. The reference generator of claim 1, wherein each of said analog voltage providing means is a digital-to-analog converter, each having an input port receiving digital data from an associated one of said output ports and having an output at which said analog output voltage appears with a magnitude established by the digital data then being received at said input port.

6. The reference generator of claim 5, further comprising a plurality of means for low-pass filtering the step-wise analog voltages provided at the output of each of said digital-to-analog converters to provide a smoothly transition of one of said output phase waveforms at the output of each of said plurality of low-pass filtering means.

7. The reference generator of claim 1, wherein said external signal providing means has an input receiving a DC signal and an output at which a periodic waveform appears with frequency established by the amplitude of the DC signal at said input.

8. The reference generator of claim 7, wherein said external signal providing means is a voltage-to-frequency converter.

9. The reference generator of claim 1, further comprising means for generating clock signals for timing transfer of digital data between said registers, said timing register, said memory means and said output ports.

10. The reference generator of claim 9, further comprising means for buffering said clock signals to provide highly stable periodic synchronization signals.

* * * * *